(12) United States Patent
Yoon

(10) Patent No.: US 6,367,657 B1
(45) Date of Patent: Apr. 9, 2002

(54) CONTROL VALVE FOR A GAS CYLINDER

(75) Inventor: Young-Ki Yoon, Buchun (KR)

(73) Assignee: Samhongsa, Co., Ltd., Seoul (KR)

( * ) Notice: Subject to any disclaimer, the term of this patent is extended or adjusted under 35 U.S.C. 154(b) by 0 days.

(21) Appl. No.: 09/775,679

(22) Filed: Feb. 5, 2001

(51) Int. Cl.$^7$ .............................................. F16K 27/00
(52) U.S. Cl. ........................................ 222/3; 251/214
(58) Field of Search ............................. 222/3; 251/214

(56) References Cited

U.S. PATENT DOCUMENTS

| | | | | |
|---|---|---|---|---|
| 3,825,221 A | * | 7/1974 | Smith, Jr. ................... | 251/214 |
| 4,336,919 A | * | 6/1982 | Hall ............................ | 251/214 |
| 4,340,204 A | * | 7/1982 | Herd .......................... | 251/214 |
| 5,178,363 A | * | 1/1993 | Icenhower et al. ......... | 251/214 |
| 5,755,269 A | * | 5/1998 | Venooker et al. .......... | 141/292 |
| 6,073,972 A | * | 6/2000 | Rivera ........................ | 285/64 |

* cited by examiner

Primary Examiner—J. Casimer Jacyna
(74) Attorney, Agent, or Firm—McGuireWoods LLP

(57) ABSTRACT

A structure for fixing a washer for preventing the deviation of the structure engaged with the inner side of a injection molded pipe holder. A control valve for a gas cylinder comprises a pipe holder having a passage on the outer peripheral surface thereof and injection molded such that a space for engaging a structure and a liner recess having a periphery corresponding to the outer diameter of the structure are formed at the lower portion thereof, and a washer for preventing the deviation and the flowing of the structure with which the pipe is engaged. A plurality of embossed bosses are pressed to the lower portion of the washer by pressing the bosses along the periphery of the extending surface of the engaging inlet of the structure of the pipe holder from a liner recess formed at the lower portion of the pipe holder by using an exterior pressing device to fixing the washer to the pipe holder.

3 Claims, 3 Drawing Sheets

CONTROL VALVE FOR A GAS CYLINDER

BACKGROUND OF THE INVENTION

1. Field of the Invention

The present invention relates to a control valve for a gas cylinder, and more particularly to a structure for fixing a washer for preventing the deviation of the structure engaged with the inner side of a injection molded pipe holder.

2. Description of the Prior Art

A conventional control valve for a gas cylinder will be explained with reference to Korean Patent Application No. 1997-5892.

As shown in FIGS. 1 and 2, a passage 11 is formed on the outer peripheral surface of a pipe holder 10. A space for engaging the structure and a pin hole 12 is formed in the central portion of the pipe holder. The pipe holder 10 is injection molded such that a liner recess 13 having a periphery corresponding to the outer diameter of the structure is formed at the lower portion thereof. An inner holder 20 is engaged with the inner side central portion of the pipe holder 10 and has a shape for forming a passage communicated with the passage 11 of the pipe holder 10. O-rings 30 are engaged with the upper and lower sides of the inner holder 20 when the pipe holder 10 is engaged with the inner holder 20. A washer 40 prevent the deviation of the structure engaged with the pipe holder 10 at the lower portion of the O-rings 30 constituted at the lower side of the inner holder 20. A protruding portion 13a is formed along the inner peripheral surface of the liner recess 13 formed at the lower portion of the pipe holder 10 to fix the washer to the pipe holder 10. The protruding portion 13a is melt by the inducing heating of the high frequency energy to fix the protruding portion 13a to the lower side of the washer 40.

An opening/closing pin 50 is engaged with the lower side of the pipe holder 10 and is penetrated through the pin hole 12. The opening/closing pin 50 is moved upward and downward in the pipe holder 10.

The structure is engaged with the inner side of the injection molded pipe holder 10, and the protruding portion 13a is formed at the lower portion of the pipe holder 10, i.e., on the liner recess 13 on which the lower surface of the washer 40 is located to fix the washer 40. The protruding portion 13a is melt by the inducing heating of the high frequency energy to prevent the deviation of the washer 40 from the pipe holder 10.

The pipe holder 10 has an inlet and an interior space having a diameter corresponding to the size of the structure to be engaged. Only the upper portion of the valve pin 50 can be penetrated through the pin hole(12).

A passage 11 is formed at the central portion of the pipe holder 10, and a liner recess 13 is formed on the lower surface.

The structure which is engaged with the pipe holder 10 comprises the inner holder 20, the O-rings 30, and a washer.

The passage 11 is communicated with the engaged inner holder 20, and the liner recess 13 has an inner diameter corresponding to the outer diameter of the washer 40.

The inner diameter of the liner recess 13 refers to an inner side hill portion for forming the liner recess 13, and the hill portion is extended to form the protruding portion 13a.

The protruding portion 13a is melt by the inducing heating of the high frequency energy and hereinafter the engaging order of the structure to the pipe holder 10 will be explained.

The inner holder 20 is engaged from the lower portion of the pipe holder 10, and the O-rings 30 are engaged with the upper side and the lower side of the inner holder 20.

Then, according to the shape of the inner holder 20, the passage having the inner surface of the pipe holder 10 and the space, and the formed passage is communicated with the passage formed in the pipe holder 10.

Then, the washer 40 is engaged with the lower portion of the O-ring 30 engaged with the lower portion of the inner holder 20.

The inner diameter of the pipe holder 10 has a multi-step and has a space for engaging the O-ring 30 and a space for engaging the washer 40. The upper side portion of the washer 40 is adhered to the inner surface of the pipe holder 10 and the lower surface of the washer 40 is identical with the liner recess 13 of the pipe holder 10.

The protruding portion extended from the liner recess 13 is melt by the inducing heating of the high frequency energy and the melt portion is adhered to the lower surface of the washer 40.

Namely, when the protruding portion 13a is melt, the inner diameter of the inlet of the pipe holder 10 engaged with the washer 40 is reduced and the melt protruding portion 13a is adhered to the lower surface of the washer 40, and thus the washer 40 is prevented from being deviated from the pipe holder 10.

Therefore, the structure engaged with inner side of the pipe holder is not flowed and firmly engaged.

After the engaging process is completed, a valve pin 50 is engaged with the lower portion of the washer 40 to be penetrated through the pin hole 12.

However, in the conventional control valve for a gas cylinder in which a structure is engaged with the integrally formed pipe holder 10 and the protruding portion 13a is melt to fix the protruding portion 13, the protruding portion is extended to the liner recess 13 and is formed so as to have a circular shape, and the protruding portion 13a is pushed upward when the protruding portion 13a is melt and thus the protruding portion 13a is not adhered to the surface of the washer 40 uniformly and the bonding surface is not smooth.

SUMMARY OF THE INVENTION

The present invention has been made to solve the above-mentioned problem, and accordingly it is an object of the present invention to provide a structure for fixing a washer for preventing the deviation of the structure engaged with the inner side of a injection molded pipe holder.

In order to achieve the above-mentioned object of the present invention, the present invention provides a control valve for a gas cylinder comprising: a pipe holder having a passage on the outer peripheral surface thereof and injection molded such that a space for engaging a structure and a liner recess having a periphery corresponding to the outer diameter of the structure are formed at the lower portion thereof, and a washer for preventing the deviation and the flowing of the structure with which the pipe is engaged, wherein a plurality of embossed bosses are pressed to the lower portion of the washer by pressing the bosses along the periphery of the extending surface of the engaging inlet of the structure of the pipe holder from a liner recess formed at the lower portion of the pipe holder by using an exterior pressing device to fixing the washer to the pipe holder.

BRIEF DESCRIPTION OF THE DRAWINGS

The above and other objects and advantages of the present invention will become readily apparent by reference to the following detailed description when considered in conjunction with the accompanying drawings wherein.

DETAILED DESCRIPTION OF THE PREFERRED EMBODIMENT

Hereinafter, a preferred embodiment of the present invention will be explained in detail with reference to the attached drawings.

Figure 1:
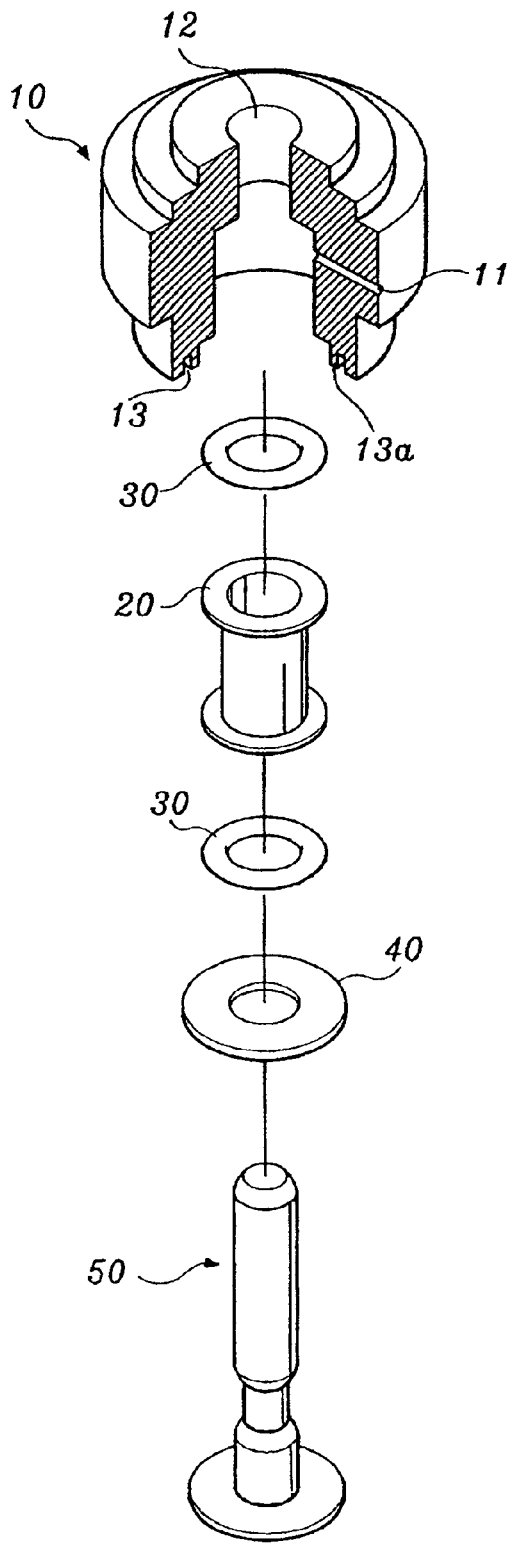
FIG. 1 is an exploded perspective view for showing a structure of a conventional control valve for a gas cylinder.
Figure 2:
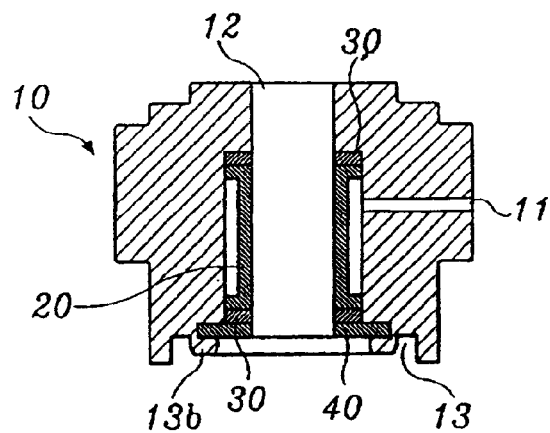
FIG. 2 is a cross-sectional view for showing the structure of the conventional control valve for a gas cylinder.
Figure 3:
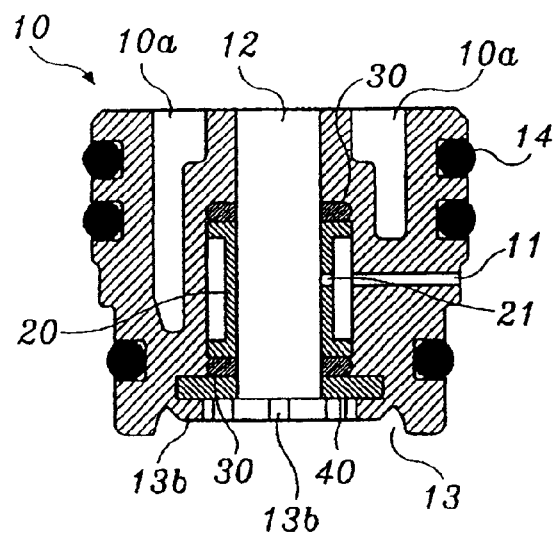
FIG. 3 is a cross-sectional view for showing a structure of a control valve for a gas cylinder according to the present invention.
Figure 4:
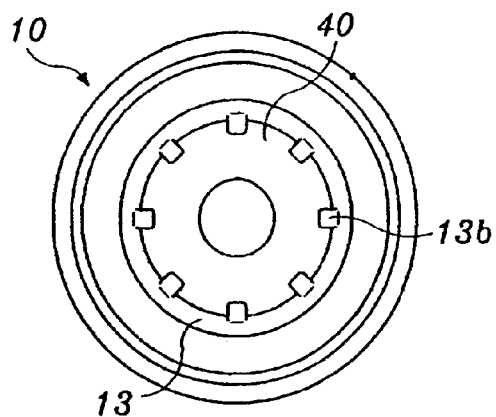
FIG. 4 is a bottom view for showing a lower surface of a pipe holder of the control valve according to the present invention.

FIG. 3 is a cross-sectional view for showing the structure of a control valve of a gas cylinder according to the present invention, and FIG. 4 is a bottom view for showing a lower surface of a pipe holder of the control valve of the present invention.

Referring to FIGS. 3 and 4, a control valve according to a preferred embodiment of the present invention comprises a pipe holder which has a passage 11 on the outer peripheral surface thereof, a space for engaging a structure at the inner center thereof, a pin hole 12 at an upper portion thereof, and a liner recess 13 at a lower portion thereof which has a peripheral portion corresponding to the outer diameter of a structure to be engaged inside, an inner holder 20 which is engaged with the inner central portion of the pipe holder 10 to form a passage which is communicated with the passage 11 of the pipe holder 10, O-rings 30 which is engaged with the upper and lower sides of the inner holder 20 when the inner holder 20 is engaged with the pipe holder 10, and a washer 40 for prevent a structure engaged with the pipe holder 10 from being deviated outside at a lower portion of the O-ring 30 provided at the lower side of the inner holder 20.

In order to fix the washer 40 to the pipe holder 10, the peripheral portion of the extending surface formed at the central portion of the pipe holder 10 is pressed by using an exterior pressing device from a liner recess formed at the lower portion of the pipe holder 10, and a plurality of embossed bosses 13b are pressed at the lower portion of the washer to fix the lower side.

A recess 10a is formed along the upper central portion of the pipe holder 10 to reduce the weight of the injection molded pipe holder 10.

A rubber ring 14 is provided to seal the outer surface of the pipe holder 10, and a penetrating passage 21 of the pipe holder 10 is connected to the passage 11.

The plurality of bosses 13b are formed at the lower portion of the engaged position of the washer 40, i.e., on the extending line of the liner recess 13 to fix the washer 40.

The extending portion of the liner recess 13 formed on the lower surface of the injection molded pipe holder 10 is pressed to the lower side of the washer 40 by an exterior pressing device after the inner holder 20, the O-ring 30, and the washer 40 is engaged in the pipe holder 10. Then, the embossed bosses 13b are plurally formed.

The extending portion of the liner recess 13, i.e., the boss 13b formed on the hill portion fixes the washer. Since the bosses 13b are formed at a predetermined interval, the bosses 13b slides through a space of the boss 13b and pressed on the lower surface of the washer 40.

According to the present invention, the washer 40 is pressed at the positions of the bosses 13b and the engagement is firmly accomplished.

Further, the recess 10a is formed along the peripheral portion to the central portion of the pipe holder 10, the weight of the control valve is reduced and thus the manufacturing cost is reduced.

Figure 5:
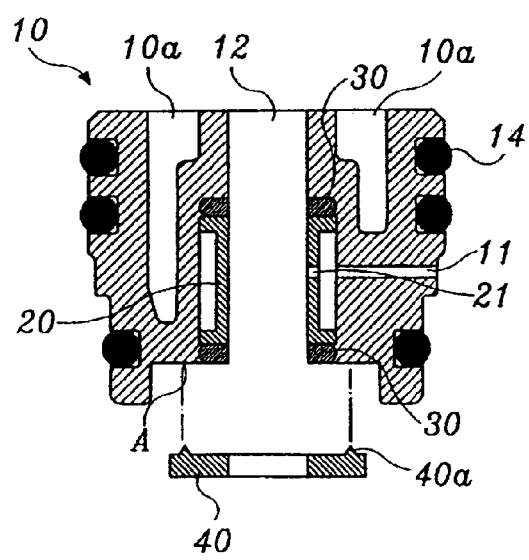
FIG. 5 is a cross-sectional view for showing the structure of another preferred embodiment of the present invention.

FIG. 5 is a view for showing another preferred embodiment of the present invention. According to the preferred embodiment of the present invention, a fusion boss portion is formed at the lower end portion of the washer adhered to an inner space of the pipe holder to which the washer is engaged. The pipe holder is directly fused to the washer by using a ultrasonic fusing device.

A fusing boss 40a is formed on the upper end surface of the washer 40 of the position corresponding to the inner surface A of the pipe holder 10 adhered to the washer 40. The ultrasonic fusing process is directly processed in the washer 40, and the fusing boss 40a is melt to be fused to the inner surface A of the pipe holder 10.

According to the preferred embodiment of the present invention, the fusing portion is not exposed to the outer surface of the pipe holder 10, and the manufacturing process is simplified.

According to another preferred embodiment of the present invention, a fusing boss 40a is formed by using a plastic washer 30, and the fusing boss 40a can be formed along the upper surface peripheral portion of the washer 40 and a plurality of embossed bosses can be formed.

According to the present invention, since an embossed boss are pressed to the lower end portion of the washer for preventing the fixing and the flowing of the structure engaged with the pipe holder, the shape of the control valve is excellent and an engaging portion can be uniformly formed along the front surface of the washer.

Further, since the fusing boss portion is formed at the upper end of the washer and the ultrasonic fusing process is directly processed in the washer to be fused on the adhering surface of the washer in the pipe holder, the manufacturing process is simple and the fusing portion is not exposed.

Furthermore, since the synthetic resin of the pipe holder is injection molded without any turning, it can be mass-produced and the manufacturing cost of the material is reduced.

As stated above, a preferred embodiment of the present invention are shown and described. Although the preferred embodiment of the present invention has been described, it is understood that the present invention should not be limited to the preferred embodiment but various changes and modifications can be made by one skilled in the art within the spirit and scope of the present invention as hereinafter claimed.

What is claimed is:

1. A control valve for a gas cylinder comprising: a pipe holder having a passage on the outer peripheral surface thereof and injection molded such that a space for engaging a structure and a liner recess having a periphery corresponding to the outer diameter of the structure are formed at the lower portion thereof, and a washer for preventing the deviation and the flowing of the structure with which the pipe is engaged, wherein a plurality of embossed bosses are pressed to the lower portion of the washer by pressing the bosses along the periphery of the extending surface of the engaging inlet of the structure of the pipe holder from a liner recess formed at the lower portion of the pipe holder by using an exterior pressing device to fixing the washer to the pipe holder.

2. A control valve for a gas cylinder according to claim 1, wherein at least one of recess is formed from the upper surface of the pipe holder beside the passage space of the pipe holder.

3. A control valve for a gas cylinder according to claim 2, wherein the recess is formed along the periphery of the central portion of the pipe holder.

* * * * *